July 14, 1925. 1,545,812
A. CHESSIN
GYROSCOPIC EQUILIBRATOR
Original Filed Oct. 29, 1920 2 Sheets-Sheet 1
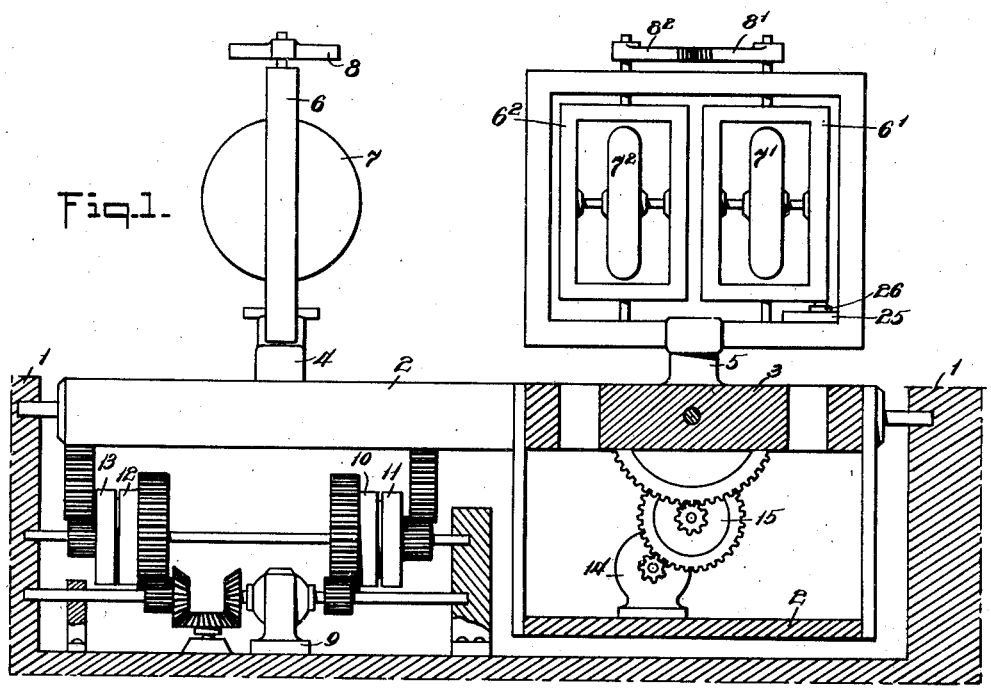
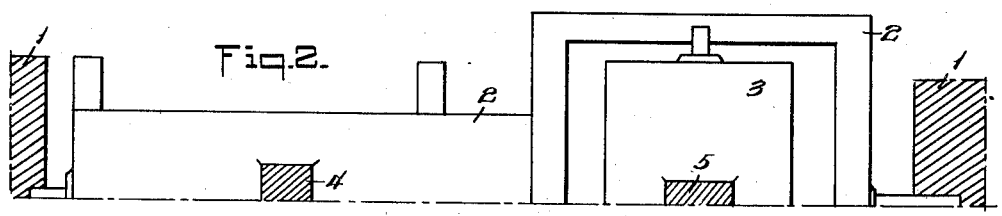
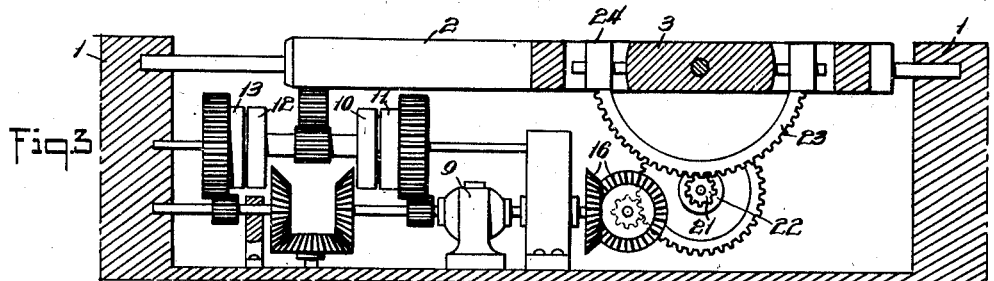
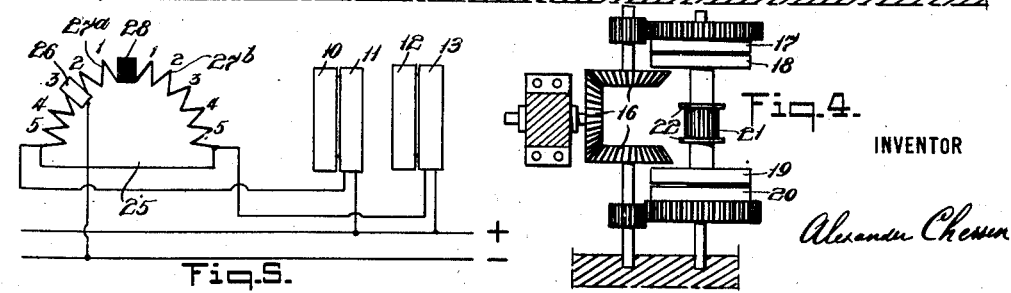
INVENTOR
Alexander Chessin July 14, 1925.

A. CHESSIN

GYROSCOPIC EQUILIBRATOR

Original Filed Oct. 29, 1920  2 Sheets-Sheet 2

1,545,812

Inventor
Alexander Chessin.

Patented July 14, 1925.

1,545,812

UNITED STATES PATENT OFFICE.

ALEXANDER CHESSIN, OF NEW YORK, N. Y.

GYROSCOPIC EQUILIBRATOR.

Application filed October 29, 1920, Serial No. 420,533. Renewed August 8, 1924.

*To all whom it may concern:*

Be it known that I, ALEXANDER CHESSIN, a citizen of Russia, and resident of New York, in the county and State of New York, have invented certain new and useful Improvements in Gyroscopic Equilibrators, of which the following is a specification.

My invention is designed to maintain a body in a predetermined position under action of disturbing causes.

This invention is applicable both when it is desired to maintain the position of a body relatively to the earth, and when the position is to be maintained relatively to the stellar space. The field of application is very broad, including stabilization of objects carried by ships navigating in air or water under all conditions which may arise. The invention also furnishes means for maintaining the position of a body which is in equilibrium under a given set of forces, when other, or additional, forces tend to disturb this equilibrium. The invention further enables one to measure such disturbing forces. Further uses and novel features of my invention will be apparent from the detailed specification which follows.

There are two methods of arriving at some of the results aimed at in this invention. One of these methods is disclosed in my companion application of even date. The other method is set forth in the present application, the differences between the two methods being briefly explained in the companion application and, furthermore, apparent from the specifications themselves.

Referring to the accompanying drawings:

Figure 1 is a front view of my device, parts of it being shown in section.

Figure 2 is a horizontal section of this device through the base of the two gyroscope carrying supports. Only one half of this section is shown, owing to the symmetry of the device.

Figure 3 is a front view of another form of my device wherein a duplex transmission system and a single motor is used in lieu of the two independent transmission systems and two motors shown in Figure 1. The gyroscopes and the gyroscope bearing supports have been omitted in this figure.

Figure 4 is a plan view of the portion of the transmission system of Figure 3 directly over it.

Figure 5 is a diagram of the electrical connections which control the operation of the device.

Figure 9:
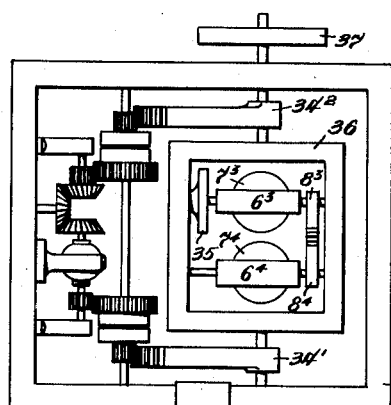

Figure 9 shows a form of my invention wherein three sets of pairs of gyroscopes are employed. The lower part of this figure is equivalent to the entire device shown in Figure 1, except that the gyroscopes and their supports are mounted on a single frame below the same, in lieu of being mounted on separate frames and above the same, as in Figure 1. The upper part of Figure 9 shows an additional gyroscopic unit similar to the other two.

Figures 8, 10:
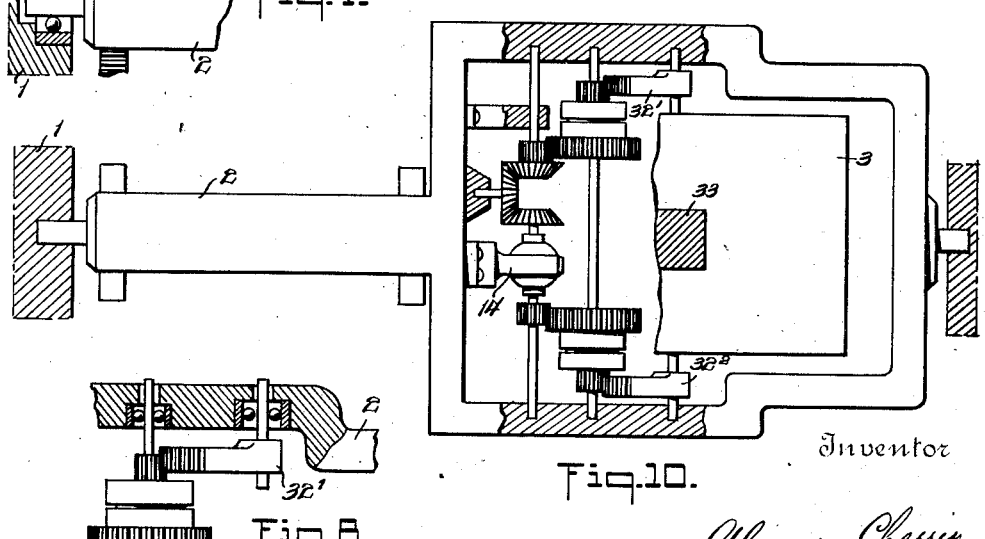

Figure 10 is a plan view, partly in section, of the apparatus shown in Figure 9.

In the following description and claims, specific names are used for identifying parts, but they are intended to be as generic in their application to similar parts as the art will permit.

Referring particularly to Figures 1 and 2, 1 indicates a body within which is journaled the frame 2. In the frame 2, a second frame 3 is journaled at right angles to the first. On this second frame 3 is mounted the support 5, in which are journaled the two frames $6'$, $6^2$, which carry the gyroscopes $7'$, $7^2$, the gyroscopes spinning in opposite direction about their respective axes. The two frames $6'$, $6^2$, are coupled by means of the toothed sectors $8'$, $8^2$, so that these frames can rotate only simultaneously, in opposite directions and at the same rate. On the frame 2 is mounted another support, 4, carrying another pair of gyroscopes, this support with all the parts mounted thereon being in every way identical to the one mounted on the frame 3, except that the entire structure is turned 90° about the vertical, so that the two structures mounted on the frames 2 and 3 may be considered as the front and the side elevations of one another. The corresponding parts are designated by corresponding numerals. On the body 1 is mounted a motor 9 and two gear trains, (one on either side of the motor, each gear train including a clutch, the actuating members of which are geared to the motor, viz, the member 10 for rotation in one direction, and the member 12 for rotation in the opposite direction. The two actuated members of these clutches, viz. 11 and 13, are geared to the frame 2. According as one, or the other, of these clutches is energized, a torque is applied to the frame 2 about the axis about which this frame is rotatable, in one, or the opposite, direction. On the frame 2 is mounted a similar transmission system, including the motor 14 and one of the clutches 15 shown in the drawing, the torque in this system being applied to the frame 3 in one, or the other, direction, according as to which one of the two clutches of this transmission system is energized.

Referring to Figures 3 and 4, they show a modification of the device through the merging of the two independent transmission systems of Figure 1 into a single system, as shown, with the single motor 9 and the two clutches (10, 11) and (12, 13) disposed on the same side of the motor. By means of the bevel gears 16, the rotation of the motor 9 is transmitted at right angles to the clutch members 17 and 20, in directions opposite to one another, and the co-operating clutch members 18 and 19 will apply a torque to the frame 3, when this clutch mechanism is energized, through the engagement of the pinion 21 with the gear wheel 23 mounted on the frame 3 for free rotation on the axle 24. In order to maintain the engagement of the pinion 21 and gear wheel 23, the pinion 21 is provided with flanges 22.

Referring to Figure 5, it is a diagrammatic sketch showing the method of energizing the various clutches, two of these, viz. (10, 11) and (12, 13) being shown in this diagram. When the contact member 26, which is fixed to one of the two gyroscope bearing frames, namely 6′, as shown in Figure 1, moves over the resistance 27$^a$ attached to the contact plate 25, the clutch member 11 is energized by a current passing through a portion of this resistance, namely, the portion between the contact point of the member 26 with this resistance and one end of this resistance. According as the contact member 26 is nearer to or farther away from, the insulating portion 28, the resistance of the circuit is increased, or decreased, and, consequently the clutch member 11 is energized with less, or more, strength respectively. When the contact member 26 moves over the resistance 27$^b$, the clutch member 13 is energized, with more, or less, strength in accordance with the distance of the contact member 26 from the insulating portion 28. This diagram serves to illustrate the operation in all cases, the arrangement being similar for the other pairs of gyroscopes and corresponding clutches.

Figure 6:
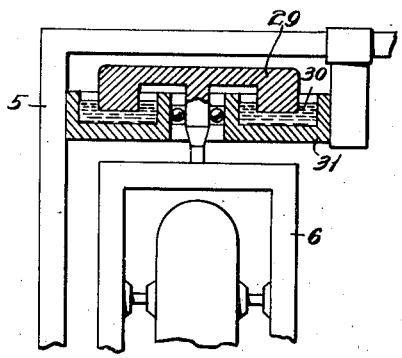
Figures 6, 7 and 8 show details of construction when complete rotational freedom of the gyroscopes about the various axes is desired.
Figure 7:
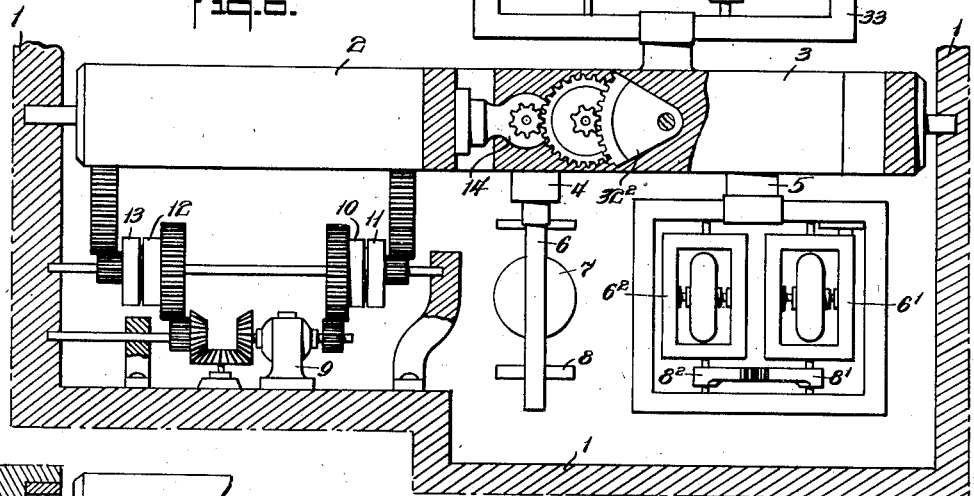

Referring to Figure 6, the gyroscope frame 6 is suspended from the support 5 by means of a float 29 immersed in the liquid 30 carried within the receptacle 31 which is firmly attached to the support 5, thus furnishing a practically frictionless bearing for the vertical axle of the frame 6. This Figure 6, as well as Figures 7 and 8, also show frictionless ball bearings for the various axles, namely, Figure 6 for the vertical axle of the frame 6, Figure 7 for the horizontal axle of the frame 2, and Figure 8 for portions of the transmission system mounted on the frame 2.

Referring to Figures 9 and 10, both the supports 4 and 5 of Figure 1 are shown mounted on the frame 3, below the same. Otherwise, the disposition of the gyroscopes and other parts mounted on these supports remains unchanged. The transmission system connected with the motor 9 is also unchanged, but the transmission system connected with the motor 14 is differently mounted, as is more clearly shown on Figure 10. In particular, the gear wheel which is shown attached to the frame 3 in Figure 1 is replaced by the gear sector $32^2$, there being another such gear sector 32′ on the opposite side of the frame 3. This re-arrangement of the transmission system, as compared with that shown on Figure 1, in no way affects the modus operandi and is made here only in order to show the additional gyroscopic unit mounted on the support 33, above the frame 3. In the support 33 is journaled a frame 36 for free rotation on a vertical axle, the body, or table, 37 being mounted on the same axle. This axle is set in rotation by a third transmission system, as shown, the gear sectors 34′ and $34^2$ acting with regard to this gyroscopic unit exactly as the gear sectors 32′ and $32^2$ do with regard to the gyroscopic unit mounted on the support 5. The frames $6^3$, $6^4$, carrying the gyroscopes $7^3$, $7^4$, are pivoted about horizontal axes and are coupled by the geared sectors $8^3$, $8^4$, opposite precession, as in the other units. The contact plate 35 of the controlling device is also indicated. Further designation by numerals has been omitted as clearly unnecessary.

The operation of the device will now be briefly explained.

Suppose, for an illustration, that the frames 2 and 3 of Figure 1, with all apparatus carried by these frames, are in static balance under the action of a set of forces which we may assume in this illustration to be the forces of gravity. Slight tendencies to disturb this balance, which may arise either through friction in the axle bearings of the two frames, or for other reasons, will ordinarily be taken care of and resisted by the two sets of gyroscopes, without affecting the balance of either the frame 2 or the frame 3. The gyroscopes will, of course, precess in response to the slightest torque, but the insulated portion 28, shown in Figure 5, may be made sufficiently wide, so that this slight precession will not carry the gyroscopes beyond the neutral zone 28 and close the circuits which energize the clutches. Suppose, now, that the body 1, in which the frames 2 and 3 are journaled, is travelling in a curved path. The centrifugal forces arising during such a period of travel will affect the gyroscopes, causing them to precess beyond the neutral zone 28. Simultaneously with the development of the centrifugal forces, the angle of precession of the gyroscopes will increase, thereby reducing the resistance in the circuit which energizes the particular clutch called into action by this precession, i. e., increasing the strength of this clutch until the torque applied to the apparatus is sufficient to counteract the torque due to the centrifugal forces. The frames 2 and 3, in the meantime, maintain their position, the effect of the disturbing forces being only to cause precession of the gyroscopes. This precession will stop as soon as the external torque applied to the frames by means of the clutches becomes equal to the disturbing torque. When the body 1 returns to a straight path, the centrifugal forces disappear, the gyroscopes precess back to their original positions, the resistance in the circuits which energize the clutches increases, and the strength of the clutches and of the torque applied by them to the frames diminishes, until the gyroscopes are back in the neutral zone, at which moment the clutches cease to operate.

When a more sensitive apparatus is required, the insulated portion 28 can be reduced in width so that the clutches become operative at the slightest indication of a disturbing cause, such as, for instance, the effect of friction in the axle bearings of the frames 2 and 3.

It should be noted that, strictly speaking, the frames 2 and 3 can not be permanently in a static balance owing to the rotation of the earth and motion of the body 1 relatively to the earth, the direction of the force of gravity constantly changing relatively to the stellar space, with a corresponding effect on the gyroscopes. But the precessional torque arising from either the rotation of the earth, or the motion of the carrying body on the earth's surface, is so slight that it is nullified by the ordinary friction of the precessional mechanism, unless especial pains are taken to make this precessional mechanism practically frictionless. Such a frictionless precessional mechanism is illustrated in Figure 6. Therefore, when using the ordinary mechanism shown throughout the accompanying drawings, except in Figure 6, the device will cause the frames 2 and 3 to maintain their position relatively to the earth at all times. When it is desired to maintain these frames in a predetermined position relatively to the stellar space, the other form of precessional mounting will be used wherein precession is made as frictionless as possible.

While the apparatus shown in Figures 1 and 3 is designed to maintain a plane in a direction fixed relatively to the earth (or stellar space), such a plane would still be capable of turning within itself. In Figure 9 is shown a form of my invention which furnishes stabilization of a body about three axes, or the maintaining of a line in a position fixed relatively to the earth (or the stellar space).

From the above explanation of the operation of the device, it is clear, further, that the precessional angle of the gyroscopes, at the moment when precession stops, is a measure of the disturbing forces, because, at that moment, these disturbing forces are equal and opposite to those applied to the apparatus by means of the clutch mechanism. Figure 5 shows a scale associated with each resistance. This scale is marked in terms of corresponding clutch torques, so that the position of the contact element 26 at once indicates the magnitude of the disturbing torque.

Clearly, the principle of operation in this device allows a great variety in the arrangements of parts. Thus, the centers of mass of various parts may be below or above their respective points of suspension or axes of rotation. Likewise, the entire pendulous system may be in either a stable, or an unstable, equilibrium under normal conditions, although, preferably, the system would be arranged in a manner whereby its center of mass would be below its center of oscillation. Then, again, the axes of spin and the axes of precession of the gyroscopes may be differently disposed, always provided that the law governing the relation between spinning, precession and torque, is not violated. For instance, in Figure 1, the axes of spin of both pairs of gyroscopes may be vertical, and the axes of precession horizontal, provided the axes of precession of each pair be at right angles to the axle of the corresponding frame. Nor is it necessary to mount each gyroscopic unit on a separate support. For instance, the two units shown in Figure 9 below the frame 3 could be mounted on the same support. The various clutches, too, may be placed at points other than those shown on the accompanying drawings, which have been selected with a view to clearness rather than by preference. Naturally, the preferred place of these clutches in each transmission system is one which connects them with the slowest moving gears.

While I have shown and described, and have pointed out in the annexed claims, certain novel features of my invention, it will be understood that various omissions, substitutions and changes in the form and details of the device as illustrated and its operation may be made by those skilled in the art, without departing from the spirit of the invention.

I claim:

1. The combination with a body, of one or more gyroscopes, and external means, brought into action by the precession of said gyroscope or gyroscopes, for exerting a varying torque on the said body.

2. The combination with a body of one or more gyroscopes, and external means for exerting a torque of varying strength on said body, said torque being controlled by the precession of the said gyroscope or gyroscopes.

3. The combination with a body rotatable about an axis, of one or more gyroscopes, and means for exerting a torque on the said body about the said axis, said torque being strengthened or weakened respectively as the precessional angle of said gyroscope or gyroscopes increases or decreases.

4. The combination with a body capable of angular deviations from a predetermined position in response to a disturbing force, of one or more gyroscopes, and means, co-operating with the said gyroscope or gyroscopes, for setting up a force equal to said disturbing force, which means oppose said angular deviations of the body from said predetermined position.

5. The combination with a body rotatable about an axis, of a pair of gyroscopes spinning in opposite directions and coupled for opposite precession, external means, brought into action by the precession of the said gyroscopes, for exerting a torque on the said body about the said axis, and means for causing the strength of the said torque to vary with the variation of the precessional angle of the said gyroscopes.

6. The combination with a body rotatable about two axes, of two pairs of gyroscopes, the gyroscopes of each pair spinning in opposite directions, and each pair being coupled for opposite precession, external means, brought into action by the precession of the said gyroscopes, for exerting torques on the said body about one, or the other, or both of the said axes, and means for causing said torques to vary in strength with the angular changes in the precession of the said gyroscopes.

7. The combination with a body adapted to be affected by an external torque, of one or more gyroscopes, and means, responsive to the precession of the said gyroscope or gyroscopes, for opposing said external torque by an equal torque.

8. The combination with a balanced body, of a pair of gyroscopes spinning in opposite directions and coupled for opposite precession, the axes of spin of said gyroscopes being parallel when no forces disturb the balance of said body, but adapted to deviate from parallelism when said body is subjected to disturbing forces, and means, controlled by said deviation of said axes of spin, for setting up forces equal and opposite to said disturbing forces.

9. The combination with a balanced body, of a pair of gyroscopes spinning in opposite directions and coupled for opposite precession, the gyroscopes being adapted to precess when said body is subjected to forces tending to disturb its balance, and means, responsive to the precession of said gyroscopes, for maintaining said balance, which means are adapted to return said gyroscopes to their original position when said disturbing forces cease to act.

10. The combination with a body, of one or more gyroscopes carried by said body, an engine located outside said body, and means for transmitting energy from said engine, which means include a device, made operative by the precession of said gyroscope or gyroscopes, for exerting a varying torque on said body.

11. The combination with a balanced body, of one or more gyroscopes adapted to precess when said body is subjected to forces tending to disturb its balance, and means, brought into action by the precession of said gyroscope or gyroscopes, for setting up forces equal and opposite to said disturbing forces when the angle of said precession exceeds a predetermined limit.

12. The combination with a body adapted to be affected by an external torque, of one or more gyroscopes, and means for measuring said torque by the precessional angle of said gyroscope or gyroscopes.

13. The combination with a balanced body, of a pair of gyroscopes spinning in opposite directions and coupled for opposite precession, the gyroscopes being adapted to precess when said body is subjected to forces tending to disturb its balance, means for measuring said disturbing forces by the precessional angle of the gyroscopes, and an indicating device connected therewith.

14. The combination with a body, of a second body rotatably connected thereto, a plurality of gyroscopes, and means disposed between said two bodies, co-operating with said gyroscopes, for exerting a variable torque on said second body.

15. The combination with a body, of a second body universally connected thereto, a pair of gyroscopes carried by said second body, the gyroscopes spinning in opposite directions and coupled for opposite precession, means disposed between said two bodies for exerting a torque on said second body, and means, controlled by the precession of said gyroscopes, for varying the strength of said torque.

16. The combination with a body, of a second body rotatably connected thereto, two pairs of gyroscopes carried by said second body, the gyroscopes of each pair spinning in opposite directions about a set of axes which are normally parallel, and coupled for opposite precession about another set of parallel axes, the said pairs of gyroscopes being so disposed that the direction of at least one of said sets of parallel axes of one pair is perpendicular to the direction of the corresponding set of parallel axes of the other pair, and means disposed between said two bodies for exerting a varying torque on said second body, which means are brought into action by the precession of one, or the other, or both pairs of gyroscopes.

17. An equilibrator comprising the following elements: a support; a pair of gyroscopes mounted thereon, the two gyroscopes spinning in opposite directions and coupled for opposite precession about parallel axes; a circuit closer one element of which is fixed relatively to said support and the other element adapted to move in unison with the precession of said gyroscopes; and means, controlled by said circuit closer, for generating a varying torque about an axis perpendicular to said parallel axes of precession.

18. The combination with a universally mounted body, of a pair of equilibrators, each equilibrator substantially as described in claim 17, the torque specified in said claim being applied to said body about one, or the other, or both of two mutually perpendicular axes.

19. The combination with a body rotatable about a number of axes, of an equal number of equilibrators, each equilibrator substantially as described in claim 17, the torque specified in said claim being variously applied to said body about said axes.

20. The combination with a body rotatable about two axes, of a system of four gyroscopes mounted on said body and coupled in pairs for concerted precession, a circuit closer associated with each pair of gyroscopes, one element of each circuit closer being fixed relatively to said body and the other element adapted to move in unison with the precession of the corresponding pair of gyroscopes, and means, controlled by said circuit closers, for applying a varying torque on said body about one, or the other, or both of said axes.

21. The combination with a body, of a frame pivoted therein for free rotation about an axis, a second frame pivoted in said first frame for free rotation about an axis perpendicular to said first axis, a support mounted on each frame, a pair of gyroscopes mounted on each support, the gyroscopes of each pair spinning in opposite directions and coupled for opposite precession, a circuit closer associated with each pair of gyroscopes, one element of each circuit closer being fixed relatively to the corresponding support and the other element adapted to move in unison with the precession of the corresponding gyroscopes, means disposed between said body and said first frame, controlled by one of said circuit closers, for applying a variable torque on said first frame about said first axis, and means disposed between said two frames, controlled by the other one of said circuit closers, for applying a variable torque on said second frame about said second axis.

22. The combination with a body, of a frame pivoted therein for free rotation about an axis, a second frame pivoted in said first frame for free rotation about a, second axis, a support mounted on said first frame, a pair of co-operating gyroscopes mounted on said support, a circuit closer having one element fixed relatively to said support and the other element arranged to move in unison with the precession of said gyroscopes, a support mounted on said second frame, a pair of co-operating gyroscopes mounted on said second support, a second circuit closer having one element fixed relatively to said second support and the other element arranged to move in unison with the precession of the second pair of gyroscopes; and means disposed between said body and said two frames, controlled by said two circuit closers, for applying a variable torque on said second frame about one, or the other, or both of said axes.

23. The combination with a body rotatable about an axis, of a support fixed on said body, a pair of gyroscopes mounted on said support, said gyroscopes spinning in opposite directions and coupled for opposite precession about parallel axes perpendicular to said first axis, a circuit closer comprising a contact member fixed relatively to said support and a co-operating contact member moving in unison with the precession of said gyroscopes, a pair of circuits associated with said circuit closer, one, or the other, of said circuits being adapted to close according as the gyroscopes precess in one, or the opposite, direction from a neutral position, a resistance in each circuit, the amount of said resistance being controlled by the position of said moving contact member, external means for applying a torque to said body about said first axis, said means including a motor and a clutch mechanism, the actuating members of said clutch mechanism being connected to said motor and the actuated members to said body, means, controlled by one of said circuits, for making said clutch mechanism operative in one direction, and means, controlled by the other one of said circuits, for making said clutch mechanism operative in the opposite direction, the strength of said clutch mechanism in either case being regulated by the strength of the corresponding circuit.

24. The combination with a body, of a gyroscope, and external means, brought into action by the precession of said gyroscope, for exerting a varying torque on said body about an axis perpendicular to the axis of precession.

25. The combination with a body, of a pair of co-operating gyroscopes adapted to precess about parallel axes, and external means, brought into action by the precession of said gyroscopes, for exerting a varying torque on said body about an axis perpendicular to said parallel axes.

26. The combination with a body, of a system of gyroscopes arranged to co-operate in pairs, the gyroscopes of each pair spinning in opposite directions about normally parallel axes and coupled for opposite precession about other parallel axes, said system being so disposed that the direction of at least one of said sets of parellel axes of any one pair of gyroscopes is perpendicular to the direction of the corresponding set of parallel axes of any other pair of gyroscopes, and external means, brought into action by the precession of said gyroscopes, for exerting a varying torque on said body.

27. The combination with a material system in static equilibrium, adapted to be affected by forces tending to disturb said equilibrium, of a plurality of gyroscopes, and means, responsive to the precession of said gyroscopes, for maintaining the equilibrium of said material system while said forces are active.

28. The combination with a body, of a plurality of gyroscopes coupled in pairs for concerted precession, a circuit closer associated with each pair of gyroscopes, one of the elements of each circuit closer being fixed relatively to said body and the other element arranged to move in unison with the precession of the corresponding gyroscopes, a source of power located outside said body, a plurality of clutches, the actuating members of said clutches being joined to said source of power and the actuated members to said body, and means, controlled by said circuit closers, for effecting an operating connection of variable strength between said actuating and said actuated clutch members.

29. The combination with a body rotatable about three mutually perpendicular axes, of three pairs of gyroscopes, the gyroscopes of each pair spinning in opposite directions and coupled for opposite precession, external means, brought into action by the precession of said gyroscopes, for exerting torques on said body about one, or two, or all of said three axes, and means for causing said torques to vary in strength with the angular changes in the precession of said gyroscopes.

30. The combination with a body, of a second body having three degrees of rotational freedom relatively thereto, a pair of gyroscopes mounted on said second body, the gyroscopes spinning in opposite directions and coupled for opposite precession, means disposed between said bodies for exerting a torque on said second body, and means, controlled by the precession of said gyroscopes, for varying the strength of said torque.

31. The combination with a balanced body, of a gyroscope adapted to precess when the body is subjected to a force tending to disturb its balance, and means for returning said gyroscope to its original position, said return being accomplished through a single swing.

32. The combination with a balanced body, of a pair of gyroscopes spinning in opposite directions and coupled for opposite precession, said gyroscopes being adapted to precess when said body is subjected to an unbalancing force, and means for returning said gyroscopes to their original positions with a non-oscillatory motion.

33. In an apparatus for stabilizing a body, the combination with one or more gyroscopes, of external means, co-operating with said gyroscope or gyroscopes, for exerting a self-adjusting stabilizing torque on said body.

34. In a body subject to the action of unbalancing forces, the combination with one or more gyroscopes, of external means, brought into action by the precession of said gyroscope or gyroscopes, for exerting a stabilizing torque on said body automatically adjusting itself to said forces.

35. In a body capable of angular deviations from a predetermined position relatively to the stellar space, the combination with one or more gyroscopes, of external means, co-operating with said gyroscope or gyroscopes, for opposing said angular deviations of the body from said predetermined position.

36. In a body capable of angular deviations, a gyroscope adapted to precess as said body develops a tendency to deviate from a predetermined position relatively to the stellar space, and means for maintaining said body in said predetermined position, which means are adapted to return said gyroscope to its original position when said tendency of the body to deviate ceases.

37. The combination with a body capable of angular deviations, of a plurality of gyroscopes, and means, responsive to the precession of said gyroscopes, for maintaining said body in a predetermined position relatively to the stellar space.

38. The combination with a body capable of angular deviations under the action of a disturbing force, of a gyroscope, and external means, responsive to the precession of said gyroscope, for setting up a counter-force to said disturbing force when said disturbing force causes a tendency in said body to deviate from a predetermined position relatively to the stellar space.

39. The combination with a body capable of angular deviations, of a system of gyroscopes paired for concerted precession, and means, responsive to said precession, for maintaining the direction of a fixed plane of said body relatively to the stellar space.

40. The combination with a body subject to angular deviations, of a system of gyroscopes co-operating in pairs, and external means, responsive to the precession of said gyroscopes, for maintaining the direction of a fixed line of said body relatively to the stellar space.

41. The combination with a body universally suspended at its center of gravity and including a plurality of gyroscopes, of means, responsive to the precession of said gyroscopes, for maintaining said body in a predetermined position relatively to the stellar space.

42. The combination with a body universally suspended at its center of mass and including a plurality of gyroscopes, of means, responsive to the precession of said gyroscopes, for maintaining the direction of a fixed line of said body relatively to the stellar space.

43. The combination with a body universally suspended and including a plurality of gyroscopes, coupled in pairs for concerted precession, of means, responsive to the precession of said gyroscopes, for maintaining said body in a predetermined position relatively to the stellar space.

44. The combination with a body universally suspended and including a plurality of gyroscopes, coupled in pairs for concerted precession, of means, responsive to the precession of said gyroscopes, for maintaining the direction of a fixed line of said body relatively to the stellar space.

Oct. 25, 1920.

ALEXANDER CHESSIN.